(12) United States Patent  (10) Patent No.: US 7,751,601 B2
Benkley, III  (45) Date of Patent: Jul. 6, 2010

(54) FINGERPRINT SENSING ASSEMBLIES AND METHODS OF MAKING

(75) Inventor: Fred G. Benkley, III, Andover, MA (US)

(73) Assignee: Validity Sensors, Inc., San Jose, CA (US)

( * ) Notice: Subject to any disclaimer, the term of this patent is extended or adjusted under 35 U.S.C. 154(b) by 1093 days.

(21) Appl. No.: 11/243,100

(22) Filed: Oct. 4, 2005

(65) Prior Publication Data

US 2006/0083411 A1   Apr. 20, 2006

Related U.S. Application Data

(60) Provisional application No. 60/615,718, filed on Oct. 4, 2004.

(51) Int. Cl.
*G06K 9/00* (2006.01)
*G01R 27/16* (2006.01)

(52) U.S. Cl. ............ 382/124; 382/106; 382/107; 324/658; 324/661; 324/662; 324/686

(58) Field of Classification Search ......... 382/115–127, 382/106, 107, 181, 312; 340/5.1–5.92; 356/27–28.5; 326/41
See application file for complete search history.

(56) References Cited

U.S. PATENT DOCUMENTS

| 4,353,056 | A |   | 10/1982 | Tsikos |   |
|---|---|---|---|---|---|
| 4,525,859 | A |   | 6/1985 | Bowles et al. |   |
| 4,550,221 | A |   | 10/1985 | Mabusth |   |
| 5,076,566 | A |   | 12/1991 | Kriegel |   |
| 5,109,427 | A |   | 4/1992 | Yang |   |
| 5,305,017 | A | * | 4/1994 | Gerpheide | 345/174 |
| 5,325,442 | A | * | 6/1994 | Knapp | 382/124 |
| 5,420,936 | A |   | 5/1995 | Fitzpatrick et al. |   |
| 5,627,316 | A | * | 5/1997 | De Winter et al. | 73/514.32 |
| 5,818,956 | A |   | 10/1998 | Tuli |   |
| 5,852,670 | A | * | 12/1998 | Setlak et al. | 382/126 |
| 5,864,296 | A | * | 1/1999 | Upton | 340/5.53 |

(Continued)

FOREIGN PATENT DOCUMENTS

DE   2213813   10/1973

(Continued)

OTHER PUBLICATIONS

Dictionary of Electronic and Engineering Term Packaging. Define: "vias" Leroy Davis. (see attached).*

(Continued)

*Primary Examiner*—Bhavesh M Mehta
*Assistant Examiner*—Mia M Thomas
(74) *Attorney, Agent, or Firm*—Stevens Law Group; David R. Stevens

(57) ABSTRACT

A fingerprint sensing module includes a sensor substrate having a sensing side and a circuit side, an image sensor including conductive traces on the circuit side of the sensor substrate, and a sensor circuit including at least one integrated circuit mounted on the circuit side of the sensor substrate and electrically connected to the image sensor. The sensor substrate may be a flexible substrate. The module may include a velocity sensor on the sensor substrate or on a separate substrate. The module may further include a rigid substrate, and the sensor substrate may be affixed to the rigid substrate.

31 Claims, 11 Drawing Sheets

U.S. PATENT DOCUMENTS

| | | | |
|---|---|---|---|
| 5,903,225 A * | 5/1999 | Schmitt et al. | 340/5.25 |
| 5,940,526 A * | 8/1999 | Setlak et al. | 382/124 |
| 6,002,815 A | 12/1999 | Immega et al. | |
| 6,016,355 A | 1/2000 | Dickinson et al. | |
| 6,259,108 B1 | 7/2001 | Antonelli et al. | |
| 6,289,114 B1 | 9/2001 | Mainguel | |
| 6,317,508 B1 | 11/2001 | Kramer et al. | |
| 6,320,394 B1 | 11/2001 | Tartagni | |
| 6,333,989 B1 | 12/2001 | Borza | |
| 6,346,739 B1 * | 2/2002 | Lepert et al. | 257/532 |
| 6,347,040 B1 | 2/2002 | Fries et al. | |
| 6,362,633 B1 * | 3/2002 | Tartagni | 324/662 |
| 6,400,836 B2 | 6/2002 | Senior | |
| 6,408,087 B1 * | 6/2002 | Kramer | 382/124 |
| 6,580,816 B2 * | 6/2003 | Kramer et al. | 382/124 |
| 6,643,389 B1 * | 11/2003 | Raynal et al. | 382/124 |
| 6,672,174 B2 * | 1/2004 | Deconde et al. | 73/862.046 |
| 6,785,407 B1 | 8/2004 | Tschudi et al. | |
| 6,941,810 B2 * | 9/2005 | Okada | 73/504.02 |
| 7,099,496 B2 * | 8/2006 | Benkley, III | 382/124 |
| 7,200,250 B2 * | 4/2007 | Chou | 382/124 |
| 7,290,323 B2 * | 11/2007 | Deconde et al. | 29/595 |
| 7,379,569 B2 * | 5/2008 | Chikazawa et al. | 382/124 |
| 7,409,876 B2 * | 8/2008 | Ganapathi et al. | 73/862.046 |
| 7,412,083 B2 * | 8/2008 | Takahashi | 382/124 |
| 7,460,697 B2 * | 12/2008 | Erhart et al. | 382/124 |
| 7,463,756 B2 * | 12/2008 | Benkley, III | 382/126 |
| 2001/0043728 A1 * | 11/2001 | Kramer et al. | 382/124 |
| 2002/0067845 A1 * | 6/2002 | Griffis | 382/107 |
| 2003/0035570 A1 | 2/2003 | Benkley, III | |
| 2003/0161512 A1 | 8/2003 | Mathiassen et al. | |
| 2003/0224553 A1 | 12/2003 | Manansala | |
| 2004/0012773 A1 | 1/2004 | Puttkammer | |
| 2004/0179718 A1 * | 9/2004 | Chou | 382/115 |
| 2004/0190761 A1 * | 9/2004 | Lee | 382/124 |
| 2005/0100196 A1 | 5/2005 | Scott et al. | |
| 2005/0110103 A1 * | 5/2005 | Setlak | 257/414 |
| 2008/0267462 A1 * | 10/2008 | Nelson et al. | 382/124 |

FOREIGN PATENT DOCUMENTS

| | | |
|---|---|---|
| EP | 1018697 A | 7/2000 |
| EP | 1 139 301 A2 | 10/2001 |
| EP | 1 531 419 A2 | 5/2005 |
| GB | 2 331 613 A | 5/1999 |
| WO | WO 90/03620 A1 | 4/1990 |
| WO | WO 98/58342 A | 12/1998 |
| WO | WO 99/28701 A | 6/1999 |
| WO | WO 99/43258 A | 9/1999 |
| WO | WO 02/61668 A1 | 8/2000 |
| WO | WO 01/22349 A1 | 3/2001 |
| WO | WO 01/94902 A | 12/2001 |
| WO | WO 02/47018 A2 | 6/2002 |
| WO | WO 02/077907 A1 | 10/2002 |
| WO | WO 03/075210 A2 | 9/2003 |
| WO | WO 2004/066194 A1 | 8/2004 |
| WO | WO 2004/066693 A1 | 8/2004 |

OTHER PUBLICATIONS

Search Report Mailed Sep. 26, 2002 for International Application No. PCT/US2001/46525.
Search Report Mailed Sep. 8, 2005 for International Application No. PCT/US2005/012792.
Search Report Mailed Dec. 12, 2005 for International Application No. PCT/US2005/013943.
Search Report Mailed Dec. 22, 2005 for European Application No. EP 05021634.0-2218.
Davide Maltoni, "*Handbook of Fingerprint Recognition*", XP002355942 Springer, New York, USA, Jun. 2003, pp. 65-69.
Vermesan et al., "*A 500-dpi AC Capacitive Hybrid Flip-Chip CMOS ASIC/Sensor Module for Fingerprint, Navigation, and Pointer Detection With On-Chip Data Processing*", IEEE Journal of Solid State Circuits, vol. 38, No. 12, Dec. 2003, pp. 2288-2294.
International Search Report and Written Opinion mailed Jan. 30, 2006 for Application No. PCT/US2005/035504.

* cited by examiner

FINGERPRINT SENSING ASSEMBLIES AND METHODS OF MAKING

CROSS REFERENCE TO RELATED APPLICATION

This application claims priority based on provisional application Ser. No. 60/615,718, filed Oct. 4, 2004, which is hereby incorporated by reference in its entirety.

FIELD OF THE INVENTION

This invention relates to electronic fingerprint image sensing systems and methods and, more particularly, to packaging configurations and methods which provide highly reliable, low cost fingerprint sensors.

BACKGROUND OF THE INVENTION

Electronic fingerprint sensing has received increased attention as a technique for reliable identification of individuals. Electronic fingerprint sensing may be used in stationary equipment, such as security checkpoints, or in portable devices, such as mobile phones and other wireless devices, and smart cards. Accordingly, electronic fingerprint sensing systems are required to be compact, highly reliable and low in cost. A particularly advantageous fingerprint sensing system is disclosed in U.S. Patent Publication No. 2003/0035570-A1, published Feb. 20, 2003.

The disclosed fingerprint sensing system includes an image sensor, a velocity sensor and a sensor circuit. The image sensor includes a linear array of capacitive sensors for capacitive sensing of ridge peaks and ridge valleys of a fingerprint on a swiped finger. The velocity sensor senses the speed of the finger as it is swiped across the image sensor. The sensor circuit supplies drive signals to the image sensor and detects image signals in response to the drive signals. The sensor circuit also supplies drive signals to the velocity sensor and detects velocity signals in response to the drive signals. The sensor circuit coordinates the image signals and the velocity signals to provide signals representative of a fingerprint image.

In order to maximize the physical and electrical robustness of an electric field-based fingerprint sensor, the sensing elements must be ruggedized by constructing them of robust materials and mechanically decoupling the sensing elements from the delicate silicon-based circuitry that activates them. The fingerprint sensor should be low in cost and protected from the abrasive, percussive and electrostatic discharge effects caused by repeated human finger contact.

Accordingly, there is a need for packaging configurations and techniques which achieve these and other objectives.

SUMMARY OF THE INVENTION

Packaging configurations and techniques using flexible and rigid materials with the above-described fingerprint sensing technology are disclosed. The fingerprint sensors are low in cost and are physically isolated from the undesired effects of repeated human finger contact. The fingerprint sensors use electrostatic methods to detect ridge peaks and ridge valleys of a fingerprint. The solid state circuitry that performs excitation and detection functions is located physically on a separate substrate. The packaging configurations provide highly reliable, low cost fingerprint sensors.

According to a first aspect of the invention, a fingerprint sensing module comprises a sensor substrate having a sensing side and a circuit side, an image sensor including conductive traces on the circuit side of the sensor substrate, and a sensor circuit including at least one integrated circuit mounted on the circuit side of the sensor substrate and electrically connected to the image sensor. The fingerprint sensing module may further comprise a velocity sensor including conductive traces on the circuit side of the sensor substrate. The sensor substrate may comprise a flexible film.

The fingerprint sensing module may further comprise a rigid substrate, wherein the circuit side of the sensor substrate is affixed to a first surface of the rigid substrate. Thus, the image sensor, the velocity sensor and the sensor circuit are physically isolated from contact with the human finger.

According to a second aspect of the invention, a fingerprint sensing module comprises a flexible substrate having a sensing side and a circuit side, an image sensor including conductive traces on the circuit side of the flexible substrate, a velocity sensor including conductive traces on the circuit side of the flexible substrate, a sensor circuit including at least one integrated circuit mounted on the circuit side of the flexible substrate and electrically connected to the image sensor and the velocity sensor, and a rigid substrate. The circuit side of the flexible substrate is affixed to a surface of the rigid substrate.

According to a third aspect of the invention, a fingerprint sensing module comprises a rigid substrate, an image sensor including conductive traces on the substrate, a velocity sensor including conductive traces on the substrate, and a sensor circuit including at least one integrated circuit mounted on the substrate and electrically connected to the image sensor and the velocity sensor. The image sensor, the velocity sensor and the sensor circuit are mounted on a first surface of the rigid substrate. The fingerprint sensing module may include a protective coating over the image sensor and the velocity sensor.

According to a fourth aspect of the invention, a method is provided for making a fingerprint sensing module. The method comprises providing a flexible substrate having a sensing side and a circuit side; forming an image sensor including conductive traces on the circuit side of the flexible substrate; forming a velocity sensor including conductive traces on the circuit side of the flexible substrate; mounting a sensor circuit including at least one integrated circuit on the circuit side of the flexible substrate; and affixing the circuit side of the flexible substrate to a surface of a rigid substrate.

According to a fifth aspect of the invention, a fingerprint sensing module comprises a first flexible substrate having an image sensor including conductive traces on the first flexible substrate and a sensor integrated circuit mounted on the first flexible substrate and electrically connected to the image sensor; a second flexible substrate having a velocity sensor including conductive traces on the second flexible substrate; and a base for mounting the first and second flexible substrates so that the conductive traces of the image sensor and the velocity sensor are substantially coplanar.

BRIEF DESCRIPTION OF THE DRAWINGS

For a better understanding of the present invention, reference is made to the accompanying drawings, which are incorporated herein by reference and wherein like elements have the same reference numerals. In the drawings.

DETAILED DESCRIPTION

Figure 1:
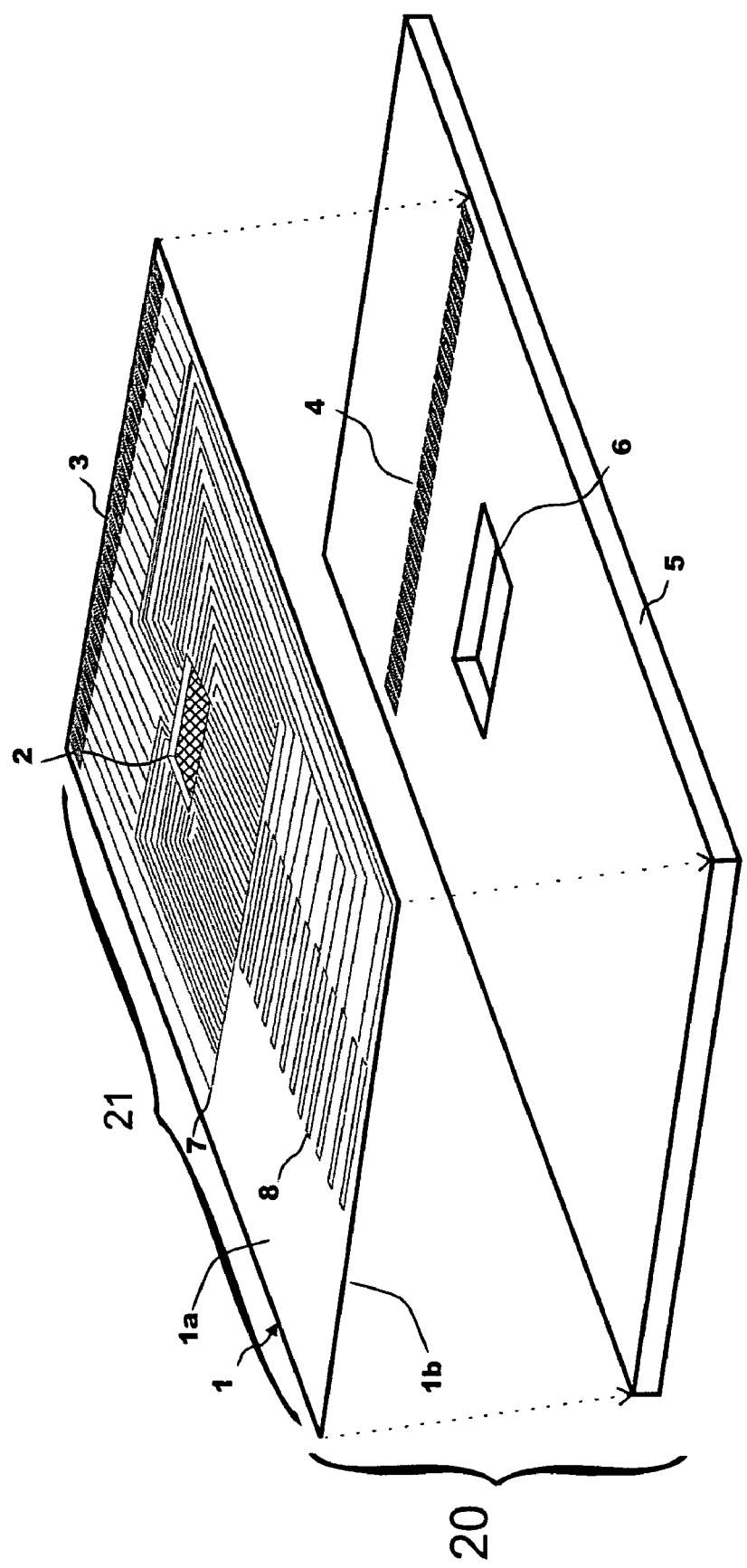
FIG. 1 is an exploded view of a fingerprint sensing module including a sensor subassembly and a rigid substrate in accordance with a first embodiment of the invention.
Figure 2:
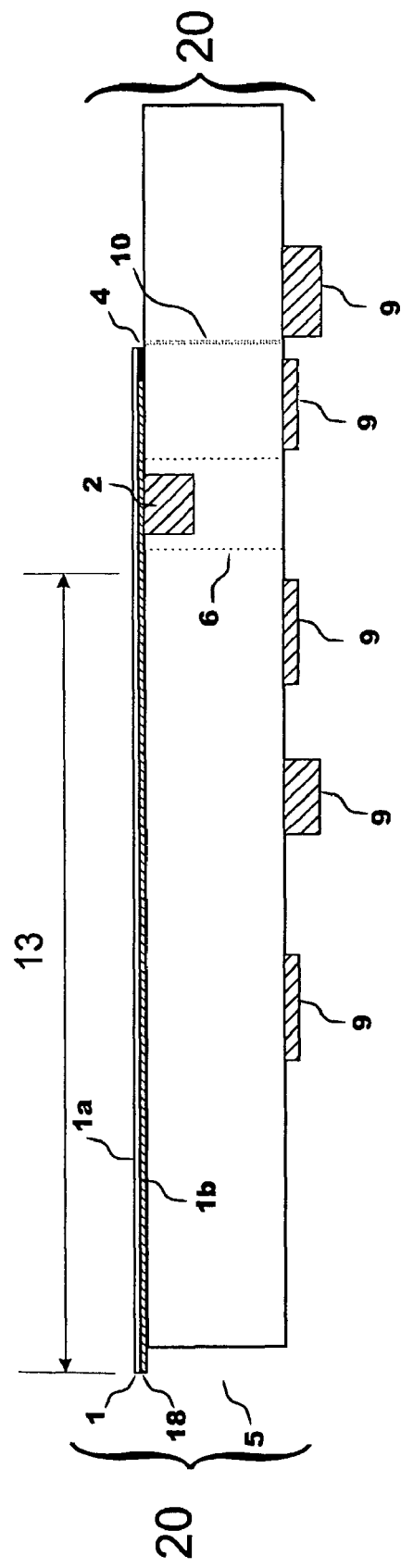
FIG. 2 is a side view of the fingerprint sensing module shown in FIG. 1.

A fingerprint sensing module 20 in accordance with a first embodiment of the invention is shown in FIGS. 1 and 2. Fingerprint sensing module 20 includes a sensor subassembly 21 and a rigid substrate 5. Sensor subassembly 21 includes a flexible substrate 1 having a sensing side 1a and a circuit side 1b. Sensor subassembly 21 further includes an image sensor 7 and a velocity sensor 8 formed as conductive traces on the circuit side 1b of flexible substrate 1. By way of example, flexible substrate 1 may be a flexible film sold under the trade name Kapton having a thickness in a range of about 25 to 100 micrometers and preferably about 38 micrometers. Image sensor 7 and velocity sensor 8 may be configured as disclosed in U.S. Patent Publication No. 2003/0035570-A1, published Feb. 20, 2003, which is hereby incorporated by reference. Additional finger rate sensors are disclosed in U.S. application Ser. No. 11/107,682, filed Apr. 15, 2005, which is hereby incorporated by reference. Sensor subassembly 21 further includes at least one sensor integrated circuit 2 attached to the circuit side 1b of flexible substrate 1. Sensor integrated circuit 2 is electrically connected to image sensor 7 and velocity sensor 8 and contains drive and sense electronics for fingerprint sensing as disclosed in the above-identified patent publication.

As disclosed in the above-identified patent publication, image sensor 7 may include a linear array of capacitive sensors for capacitive sensing of ridge peaks and ridge valleys of a fingerprint on a moving finger. The image sensor may include an image pickup plate disposed generally orthogonally to a direction of movement of the finger, and a plurality of image drive plates in spaced relation to the image pickup plate to define a plurality of sensor gaps between respective image drive plates and the image pickup plate. The ridge peaks and ridge valleys of the fingerprint passing over the sensor gaps produce a change in capacitance between respective image drive plates and the image pickup plate.

The velocity sensor 8 may include two or more finger detectors spaced apart along a direction of movement of the finger. Each of the finger detectors includes at least one drive plate and at least one pickup plate. An end of the finger passing over each of the finger detectors produces a change in capacitance between respective drive plates and pickup plates.

The conductive traces of the image sensor 7 and the velocity sensor 8 may be formed on flexible substrate 1 using known lithographic techniques. Interconnect pads 3 are also formed on flexible substrate 1 with the conductors of image sensor 7 and velocity sensor 8. Interconnect pads 3 provide external connections to the circuitry on sensor subassembly 21. Additional details regarding image sensor 7 and velocity sensor 8 are disclosed in the above-identified patent publication.

It will be understood that the packaging configuration and techniques disclosed herein are not limited to use with the sensors described in the above-identified patent publication. Other fingerprint image sensors may be utilized, and in some embodiments, a velocity sensor may not be required.

The conductive traces of image sensor 7, velocity sensor 8 and interconnect pads 3 are etched or otherwise formed on flexible substrate 1. Then, the sensor integrated circuit 2 is flipped and mounted onto mating pads on flexible substrate 1. Sensor integrated circuit 2 may be flip chip bonded onto flexible substrate 1 by a known assembly process referred to as chip-on-film (COF). This standard COF process involves pre-bumping the die pads and then reflowing the bumps onto mating pads on flexible substrate 1. This attachment process connects the sensor integrated circuit 2 to image sensor 7, velocity sensor 8 and interconnect pads 3, thereby forming thin flexible sensor subassembly 21.

Rigid substrate 5 is fabricated with interconnect pads 4 and a cutout 6 having larger dimensions than sensor integrated circuit 2 to allow flush mounting of sensor subassembly 21 to rigid substrate 5. Interconnect pads 3 of sensor subassembly 21 can be attached to interconnect pads 4 of rigid substrate 5 by standard techniques such as solder reflow or a conductive adhesive process such as Anisotropic Conductive Film (ACF). The sensor subassembly 21 can be attached to rigid substrate 5 using an adhesive 18. The adhesive can be a room temperature contact adhesive or a low temperature thermosetting adhesive. The rigid substrate 5 can serve as a mounting platform for electrical components 9 not contained in the sensor integrated circuit 2. Components 9 can be attached to rigid substrate 5 using standard circuit board assembly techniques before attachment of sensor subassembly 21. One of components 9 may be a connector for connection of the fingerprint sensing module 20 to a host system.

A desirable feature of fingerprint sensing module 20 is that no direct contact occurs between the finger being imaged and the sensor integrated circuit 2 or sensors 7 and 8. These components are located on the opposite surface of flexible substrate 1 from the surface where the finger is swiped. The sensor integrated circuit 2 is not in the swiping path 13 of the finger when the module is mounted in a case. Another desirable feature is that flexible substrate 1 electrically and mechanically isolates the conductive traces of image sensor 7 and velocity sensor 8 because they are sandwiched between flexible substrate 1 and rigid substrate 5. This provides a high degree of immunity from static discharge and mechanical abrasion.

Figure 3:
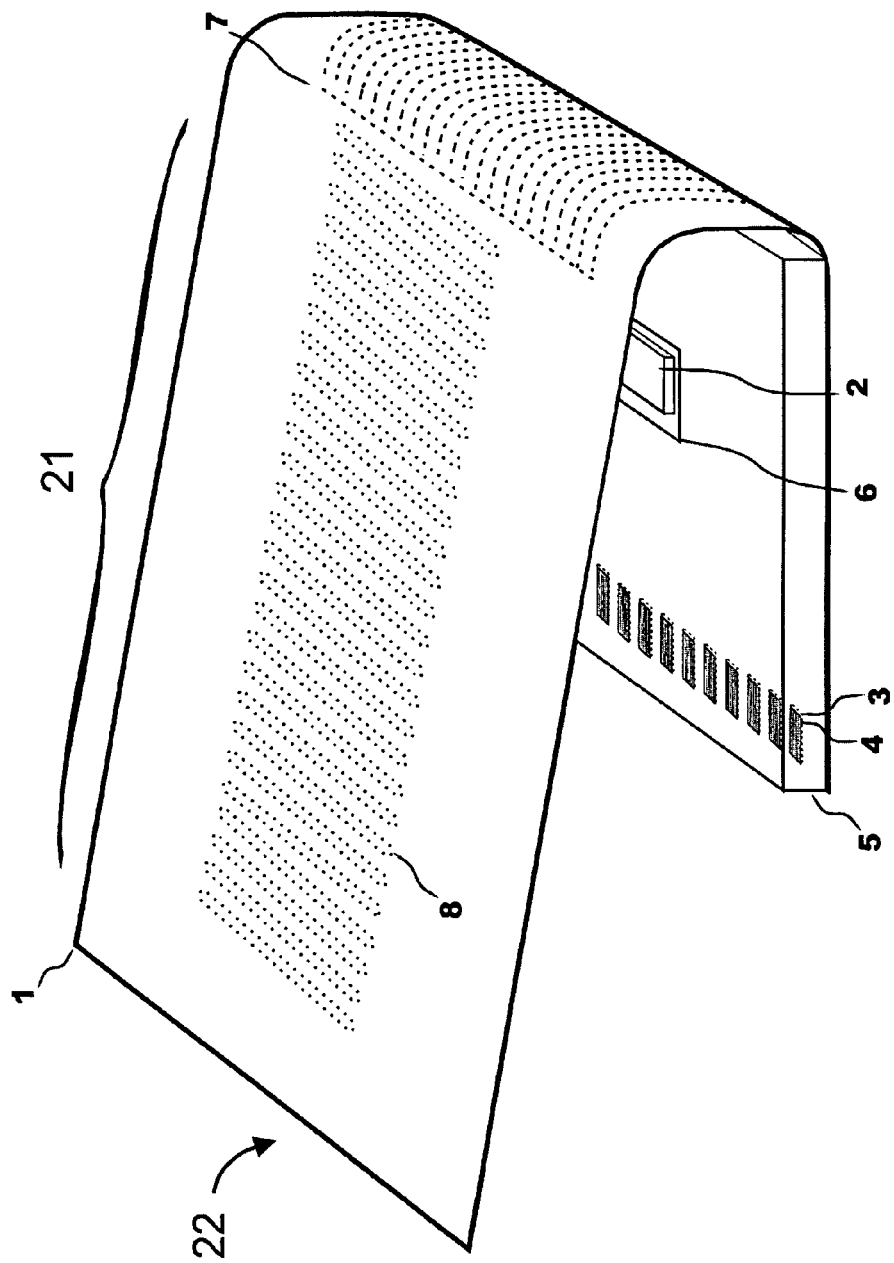
FIG. 3 illustrates a second embodiment of a fingerprint sensing module that allows the sensing portion of the flexible substrate to be attached to another device.

A fingerprint sensing module 22 in accordance with a second embodiment of the invention is shown in FIG. 3. In the embodiment of FIG. 3, a sensing section of flexible substrate 1, including image sensor 7 and velocity sensor 8, is not attached to rigid substrate 5. The sensing section of flexible substrate 1 can be attached to or formed directly to the surface of a mounting case or other structure, while another section of flexible substrate 1 can be affixed to rigid substrate 5. Rigid substrate 5 can be mounted on an internal surface or circuit board that provides mechanical support and electrical interconnection. In this embodiment, sensor subassembly 21 is larger than rigid substrate 5. The interconnect pads 3 on flexible substrate 1 may be attached to interconnect pads 4 on rigid substrate 5 using a conductive adhesive process as described above. The embodiment of FIG. 3 provides the ability to contour the sensing section of sensor subassembly 21 to a product surface or other device and/or to utilize sensor module 22 in space-constrained applications.

Figure 4:
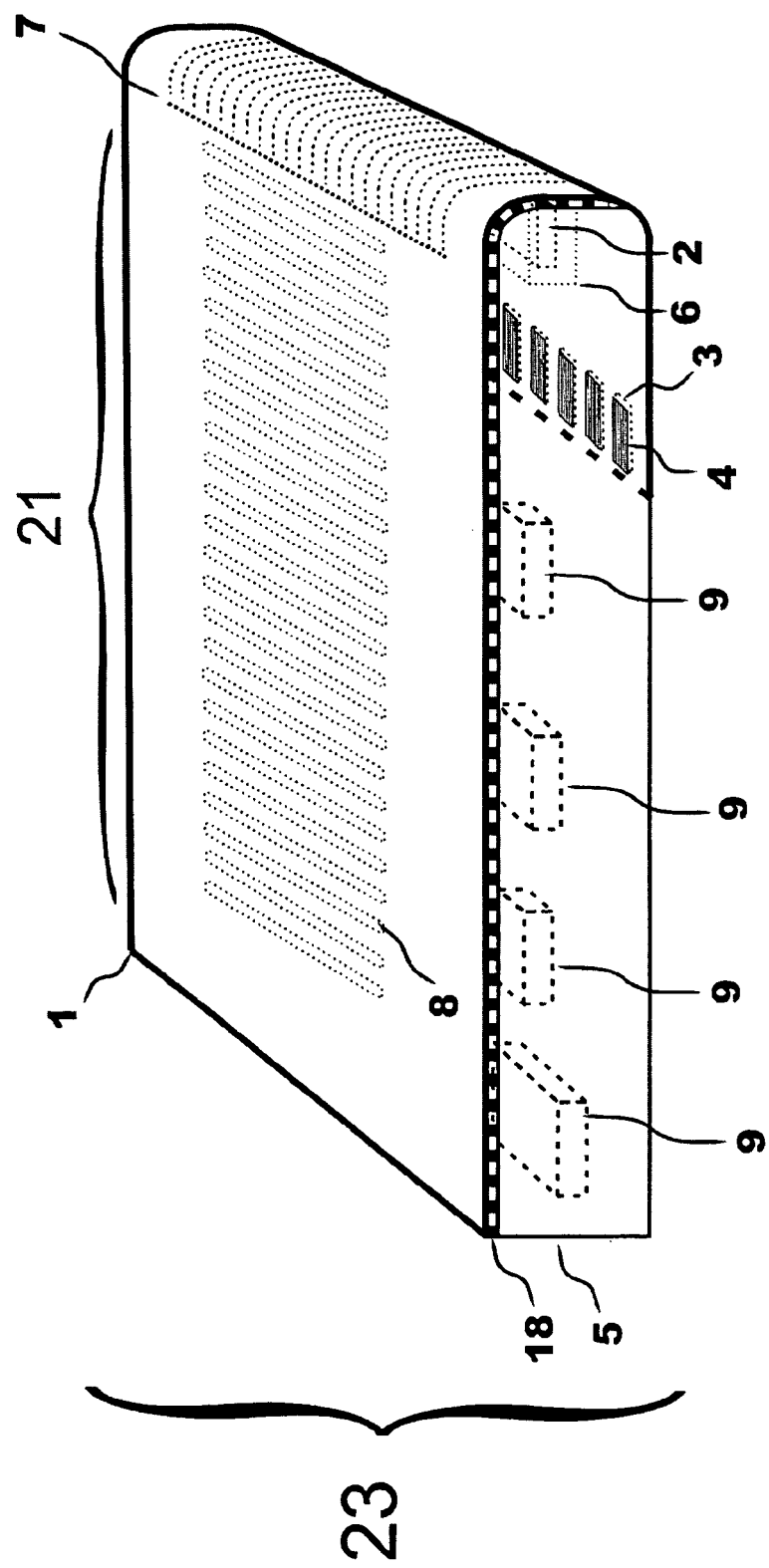
FIG. 4 illustrates a third embodiment of a fingerprint sensing module, wherein the flexible substrate is wrapped around a rigid substrate with surface-mounted components and interconnect.

A fingerprint sensing module 23 in accordance with a third embodiment of the invention is shown in FIG. 4. In the embodiment of FIG. 4, sensor subassembly 21 is wrapped around rigid substrate 5, which functions as a mechanical and electrical platform for the sensing module. As described above, sensor subassembly 21 can be attached to rigid substrate 5 using an adhesive 18. Interconnect pads 3 on flexible substrate 1 can be attached to mating interconnect pads 4 on rigid substrate 5 using a conductive adhesive as described above. Electrical components 9, optionally including a connector, are mounted on the bottom side of rigid substrate 5.

The embodiment of FIG. 4 provides the benefits of the previous embodiments in a package with reduced size and cost. This embodiment provides increased physical protection of sensor integrated circuit 2, since it is located in cutout 6 on a bottom surface of rigid substrate 5. A further benefit is realized by the image sensor 7 being in closer proximity to the edge of the package, which allows the image sensor 7 to be placed at the edge of a case or other enclosure, making it easier for the user to maintain uniform contact with the sensor surface during the swiping motion. A similar improvement may be achieved by placing a well or step in the case or other enclosure near image sensor 7.

Figure 5:
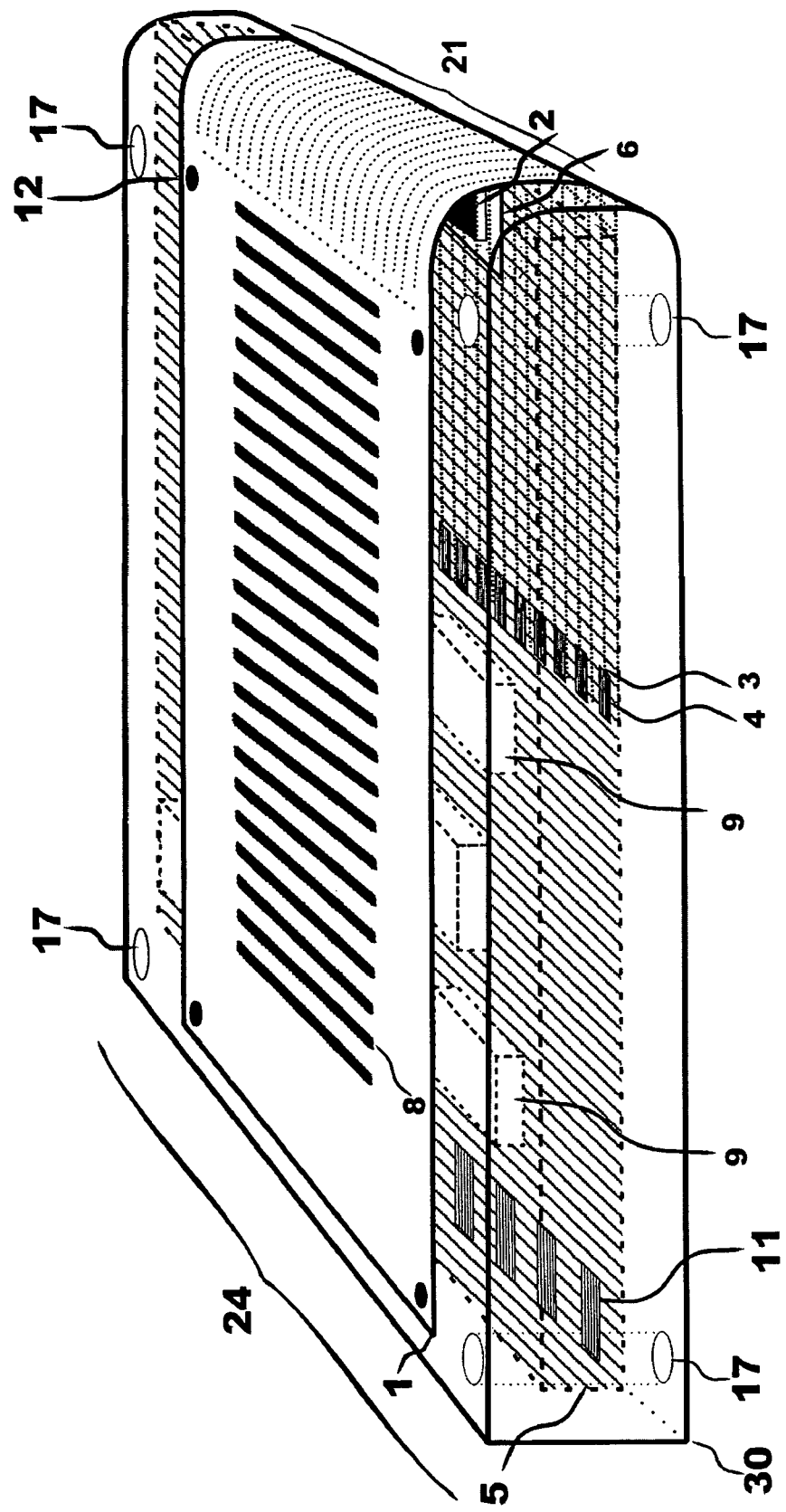
FIG. 5 illustrates a fourth embodiment of a fingerprint sensing module, wherein the flexible substrate is wrapped around a structural base that also anchors a rigid substrate with surface-mounted components and interconnect.
Figure 5A:
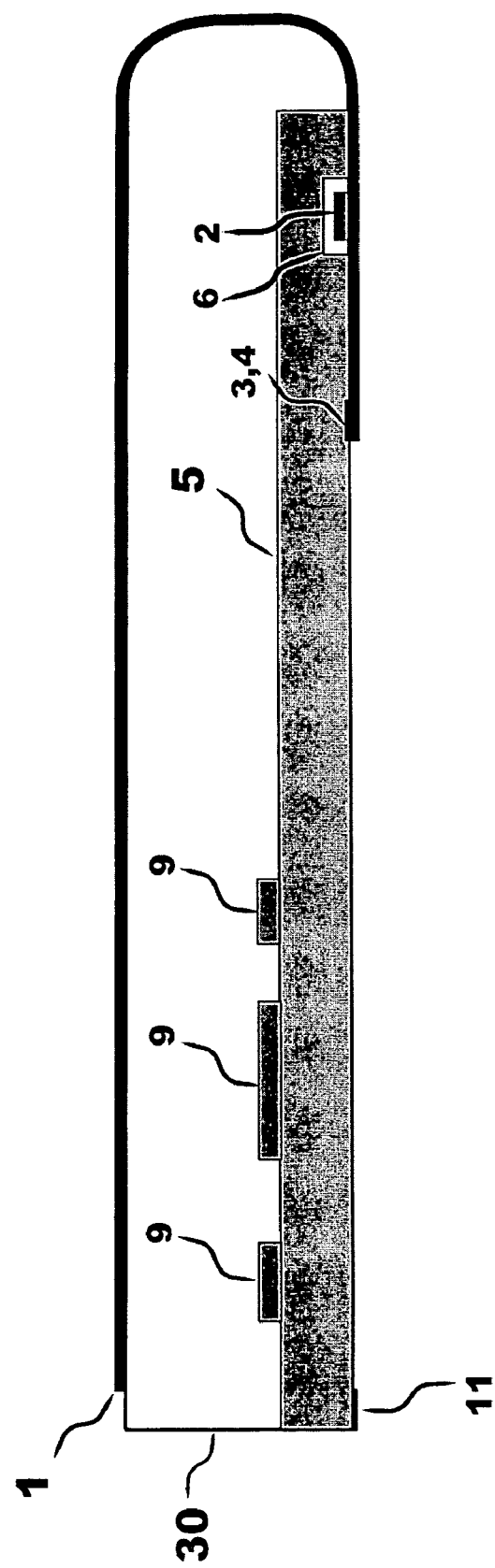
FIG. 5a is a cross section of the fingerprint sensing module of FIG. 5.

A fingerprint sensing module 24 in accordance with a fourth embodiment of the invention is shown in FIGS. 5 and 5a. In the embodiment of FIGS. 5 and 5a, sensor subassembly 21 and rigid substrate 5 are mounted to a separate structural base 30. Base 30 provides a curved surface around which sensor subassembly 21 is wrapped. The base 30 is configured to receive rigid substrate 5. In this embodiment, circuit components 9 are mounted on the upper surface of rigid substrate 5. Electrical connections between interconnect pads 3 on flexible substrate 1 and interconnect pads 4 on rigid substrate 5 are made as discussed above. Sensor subassembly 21 is attached to base 30 by aligning holes in flexible substrate 1 with mounting features 12, such as pins or mounting holes, which are molded or otherwise formed in base 30. In other embodiments, sensor subassembly 21 may be attached to base 30 with an adhesive. Rigid substrate 5 may snap into the underside of base 30. Mounting features 17 may be provided to facilitate incorporation of the sensing module 24 into a case or system. Base 30 may be made of a plastic material. In some embodiments, base 30 may be a translucent material, and one or more light sources, such as LEDs, may be mounted on rigid substrate 5 to create a backlit module.

The embodiment shown in FIGS. 5 and 5a includes a direct contact connector 11 that connects fingerprint sensing module 24 to its host. This process cannot be performed with standard thermal reflow or thermoset technologies; because the module has thermal limits imposed by the previously thermally cured COF and ACF connections. Module 24 may be connected to the host system using a compressible connector technology, such as a conductive elastomer strip.

Figure 6:
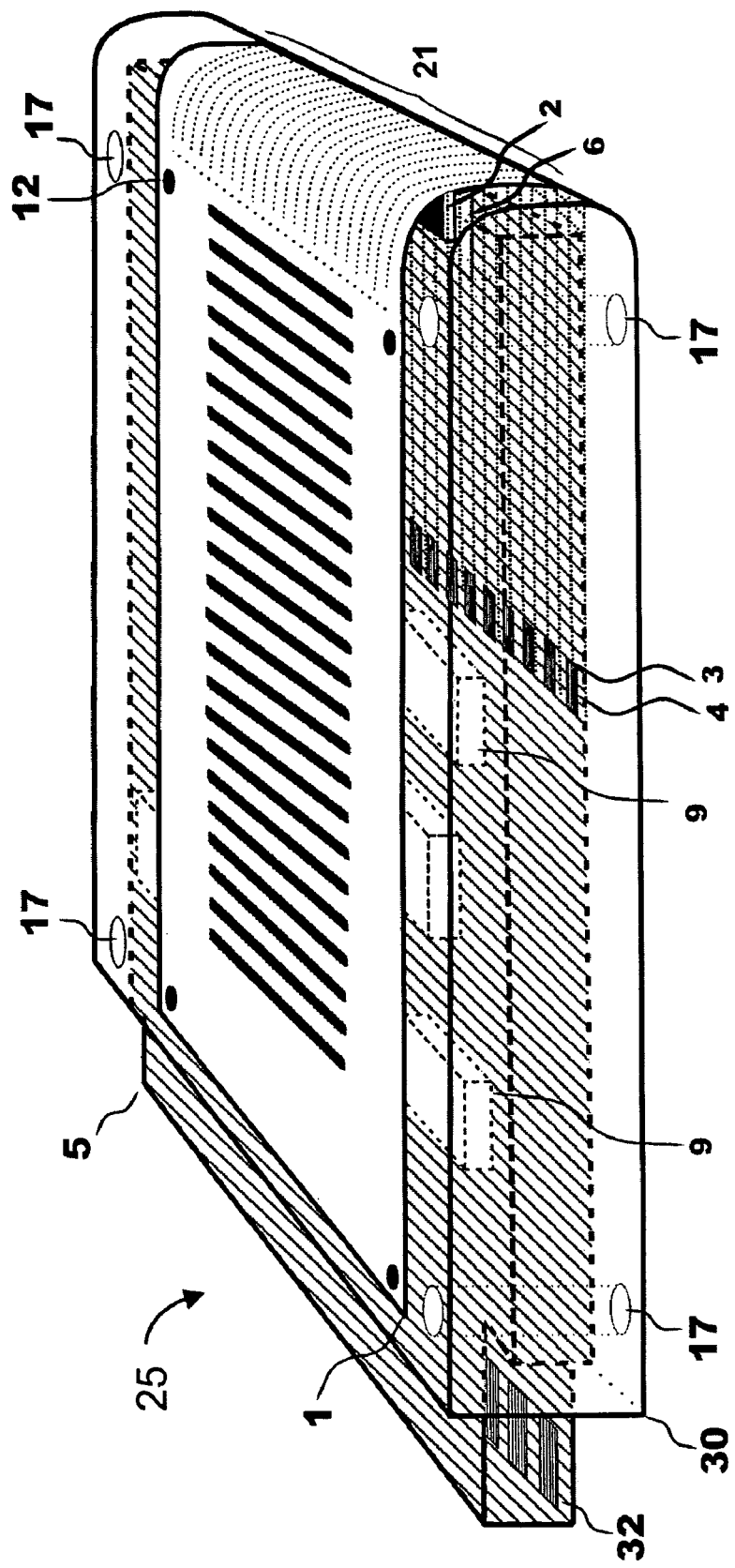
FIG. 6 illustrates a fifth embodiment of a fingerprint sensing module including an edge connector that is integral to the rigid substrate.
Figure 6A:
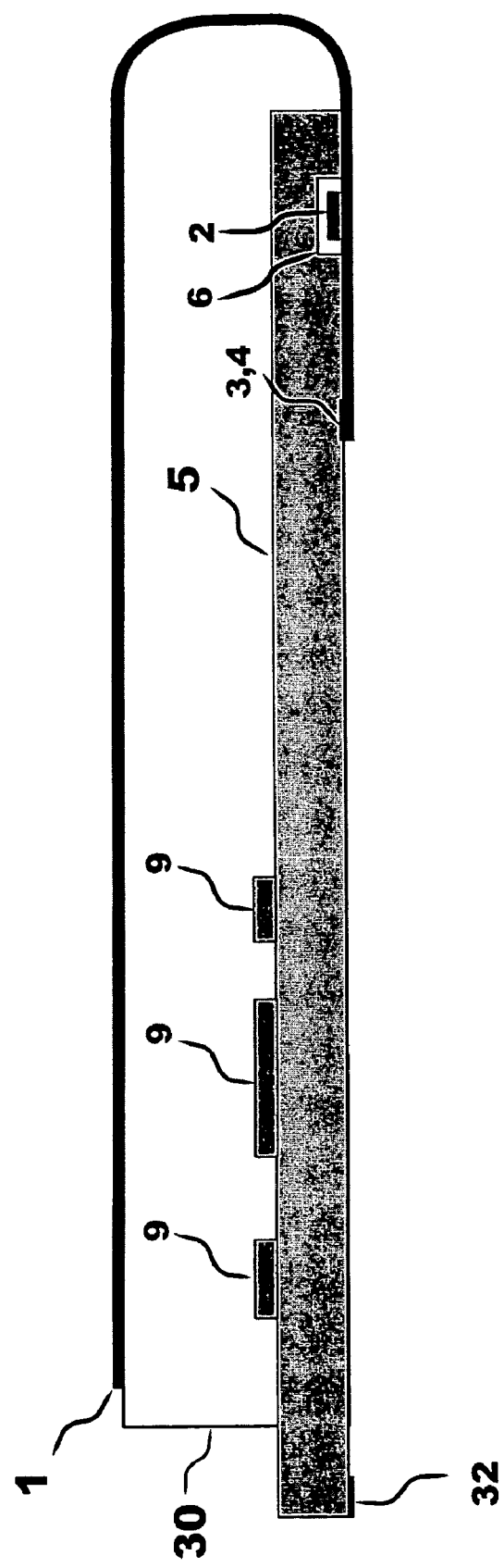
FIG. 6a is a cross section of the fingerprint sensing module of FIG. 6.

FIGS. 6 and 6a show a fifth embodiment of the invention where rigid substrate 5 is extended to protrude out of base 30 to facilitate connection to the host system. The connection to the host system may be implemented, for example, as metallized connector pads 32, a separate connector mounted on rigid substrate 5 or as holes in rigid substrate 5 for connection of individual wires. A fingerprint sensing module 25 is shown in FIGS. 6 and 6a.

In the embodiments of FIGS. 5, 5a, 6 and 6a, sensor integrated circuit 2 is protected from static discharge and mechanical damage, because integrated circuit 2 is fully enclosed in cutout 6 formed between flexible substrate 1, rigid substrate 5 and base 30. The image sensor 7 and the velocity sensor 8 are protected from mechanical wear and abrasion because they are sandwiched between flexible substrate 1 and base 30. The circuit components 9 are mechanically and electrically protected because they are sandwiched between base 30 and rigid substrate 5. The curvature of base 30 can be designed to provide an optimal surface to facilitate uniform finger contact as the user swipes his/her finger across image sensor 7 and velocity sensor 8.

Figure 7:
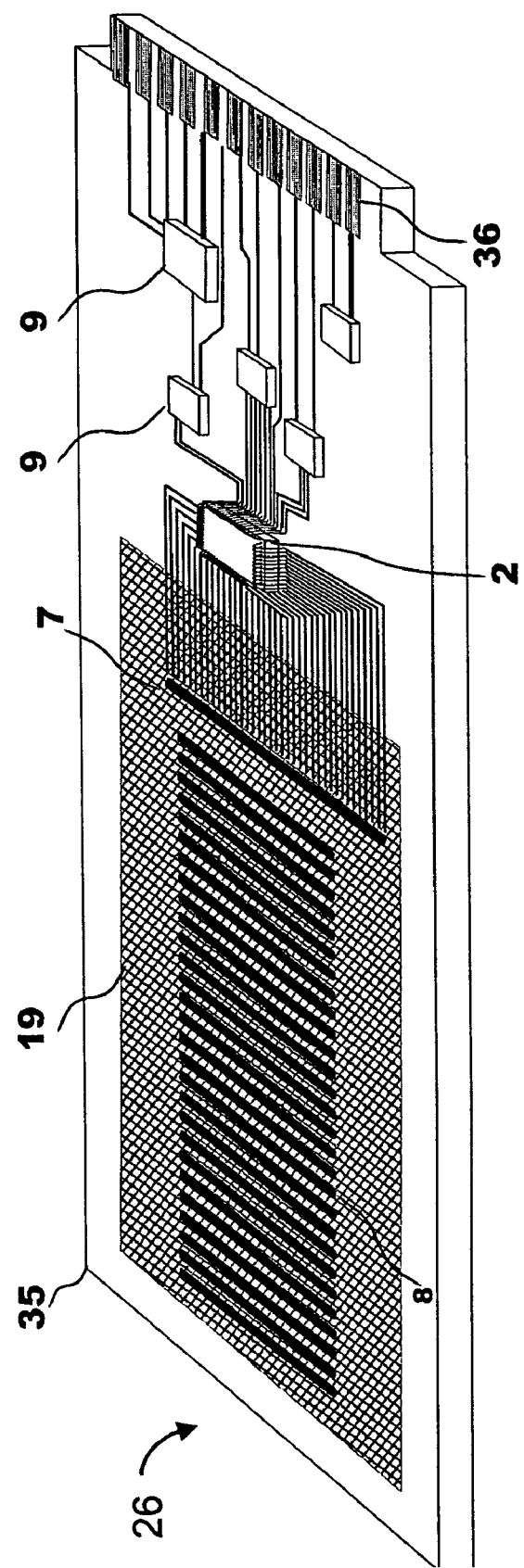
FIG. 7 illustrates a sixth embodiment of a fingerprint sensing module, including an integrated circuit attached directly to a single rigid substrate along with surface-mounted components and interconnect.

A fingerprint sensing module 26 in accordance with a sixth embodiment of the invention is shown in FIG. 7. Sensor integrated circuit 2 is mounted on the top side of a substrate 35, which can be flexible or rigid. Sensor integrated circuit 2 is attached to substrate 35, either by a direct bond wire-to-board method or by flip chip reflow bonding as discussed above. Circuit components 9 can be mounted on substrate 35 or located in the host system. The conductive traces of image sensor 7 and velocity sensor 8 are etched or otherwise formed on the top side of substrate 35 and on the same side as sensor integrated circuit 2. A protective coating 19 is applied to the top side of substrate 35 over image sensor 7 and velocity sensor 8 for electrical isolation and mechanical protection from abrasive forces.

The fingerprint sensing module of FIG. 7 has only a single substrate with fewer assembly steps and therefore potentially lower cost. The coating 19 seen by the user may be pigmented. The surface finish of coating 19 can be modified to improve swipe ergonomics. A connector 36 provides connection of the fingerprint sensing module to the host system.

Figure 8:
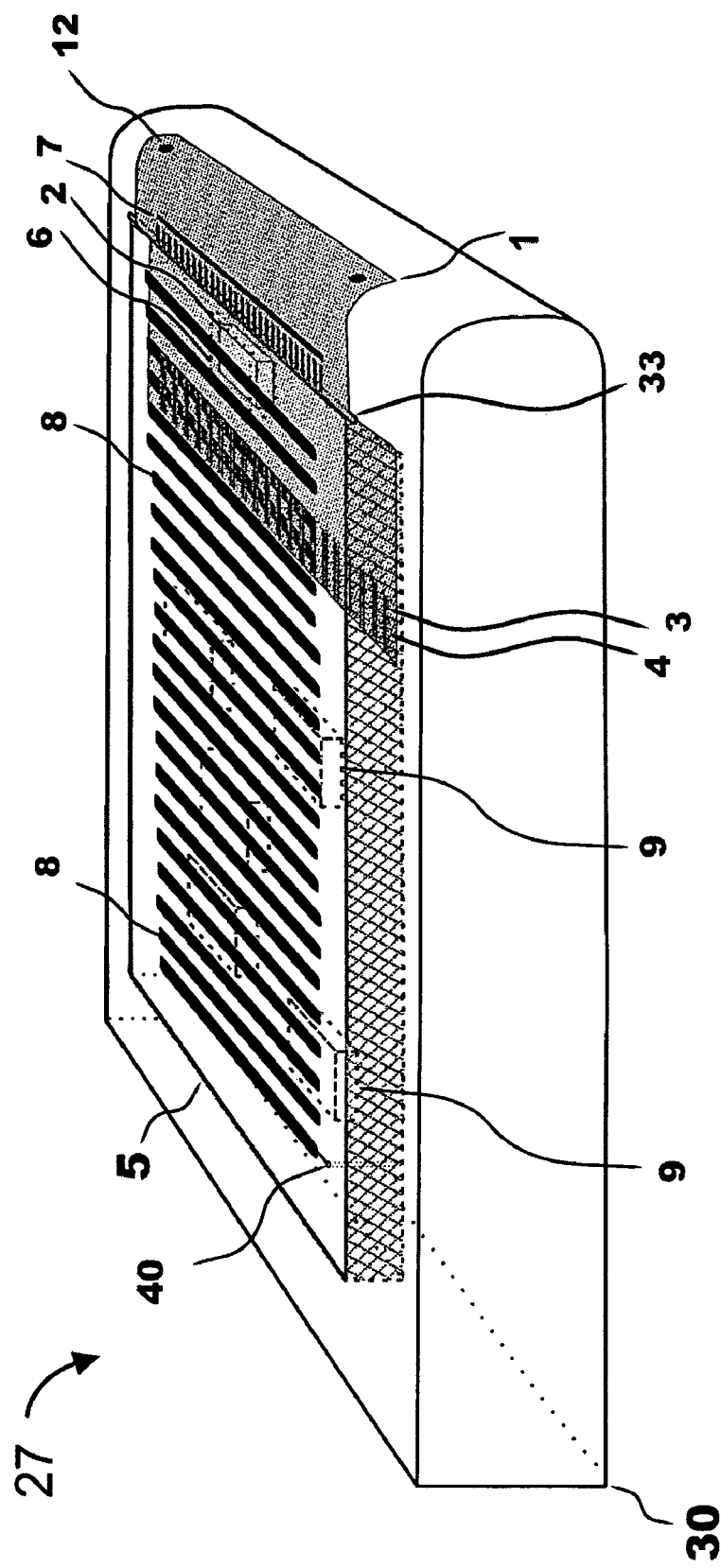
FIG. 8 illustrates a seventh embodiment of a fingerprint sensing module, including an image sensor and a velocity sensor on separate substrates.
Figure 8A:
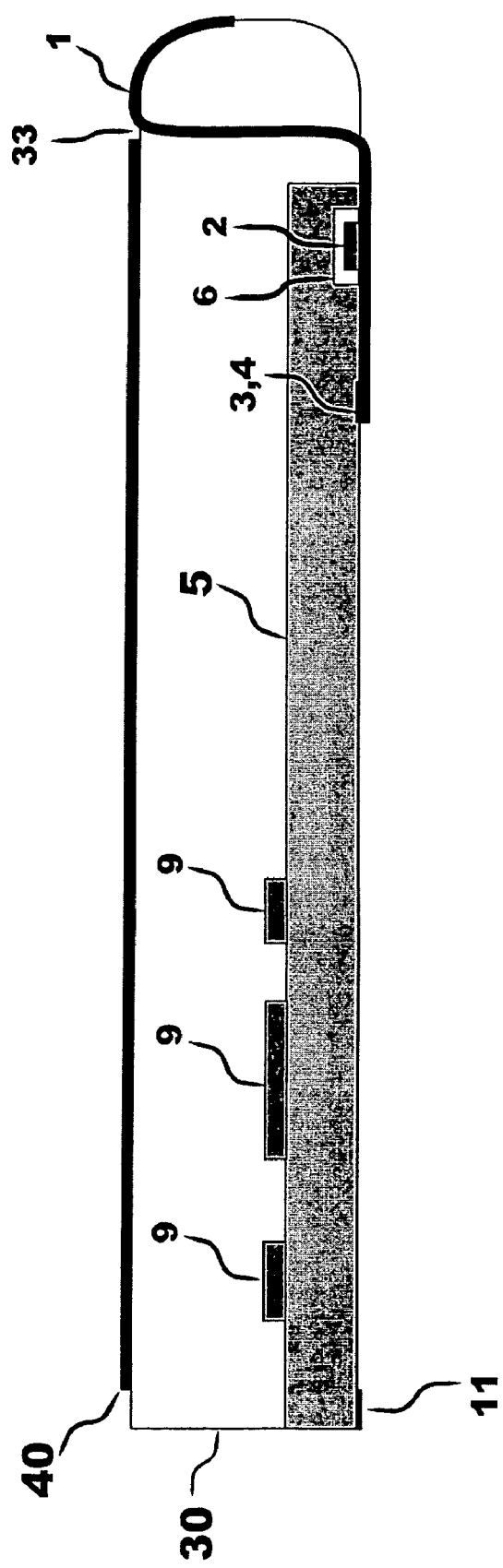
FIG. 8a is a cross section of the fingerprint sensing module of FIG. 8.

A fingerprint sensing module 27 in accordance with a seventh embodiment of the invention is shown in FIGS. 8 and 8a. In the embodiment of FIGS. 8 and 8a, velocity sensor 8 is formed on a flexible substrate 40. Image sensor 7 and interconnect pads 3 are etched or otherwise formed on flexible substrate 1, and sensor integrated circuit 2 is mounted on flexible substrate 1. Flexible substrates 1 and 40 are mounted on base 30 so that image sensor 7 and velocity sensor 8 are facing base 30 and are substantially coplanar. Rigid substrate 5 is mounted to an underside of base 30 opposite flexible substrate 40. In the embodiment of FIGS. 8 and 8a, a portion of flexible substrate 1 extends into a slot 33 in base 30 and is connected to rigid substrate 5. Interconnect pads 3 of flexible substrate 1 are attached to interconnect pads 4 of rigid substrate 5 as described above. The velocity sensor 8 on flexible substrate 40 can be connected to rigid substrate 5 or to flexible substrate 1 by a flexible tab. For connection to rigid substrate 5, the flexible tab may extend through slot 33. Rigid substrate 5 has electrical interconnects etched or otherwise formed on both sides and vias interconnecting different layers. Interconnect density can be increased by adding internal interconnect layers to rigid substrate 5. Electrical components 9 are mounted on the top surface of rigid substrate 5. Rigid substrate 5 may be provided with an edge connector 11. Cutout 6 may be formed on the bottom of rigid substrate 5 to accommodate sensor integrated circuit 2.

Flexible substrate 1 is electrically and mechanically connected by interconnect pads 3 to interconnect pads 4 of rigid substrate 5 as described above and is secured to base 30 by holding pins 12 or an adhesive.

A protective coating may be deposited or a protective film may be affixed to the top surface of module 27, covering flexible substrate 40, flexible substrate 1 and slot 33 so as to electrically and mechanically isolate image sensor 7 and velocity sensor 8. In the embodiment of FIGS. 8 and 8a, the length and cost of flexible substrate 1 are reduced in comparison with other embodiments in which velocity sensor 8 is formed on flexible substrate 1.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A fingerprint sensing module comprising:
   a sensor substrate having a sensing side and a circuit side;
   an image sensor including conductive traces on the circuit side of the sensor substrate and comprising:
      at least one linear array of capacitive sensors for capacitive sensing of ridge peaks and ridge valleys of a fingerprint on a moving finger,
      at least one image pickup plate disposed generally orthogonally to a direction of movement of the finger, and at least one drive plate in spaced relation to said at least one image pickup plate to define at least one sensor gap between the respective at least one image drive plate and said at least one image pickup plate, wherein the ridge peaks and ridge valleys of the fingerprint passing over the at least one sensor gap produce a change in capacitance between the respective at least one image drive plate and said at least one image pickup plate; and
   a sensor circuit including at least one integrated circuit mounted on the circuit side of the sensor substrate and electrically connected to the image sensor.

2. A fingerprint sensing module as defined in claim 1, further comprising a velocity sensor including conductive traces on the circuit side of the sensor substrate, wherein the velocity sensor is electrically connected to the sensor circuit.

3. A fingerprint sensing module as defined in claim 2, wherein the sensor substrate comprises a flexible film.

4. A fingerprint sensing module as defined in claim 3, further comprising a rigid substrate, wherein the circuit side of the sensor substrate is affixed to a first surface of the rigid substrate.

5. A fingerprint sensing module as defined in claim 4, wherein the circuit side of the sensor substrate is affixed to the first surface of the rigid substrate with an adhesive.

6. A fingerprint sensing module as defined in claim 4, wherein a first section of the sensor substrate is affixed to the first surface of the rigid substrate with an adhesive and a second section of the sensor substrate is attachable to another device.

7. A fingerprint sensing module as defined in claim 4, wherein the rigid substrate includes a cutout for receiving the at least one integrated circuit.

8. A fingerprint sensing module as defined in claim 4, further comprising one or more circuit components mounted on a second surface of the rigid substrate, wherein the one or more circuit components are connected to the sensor circuit.

9. A fingerprint sensing module as defined in claim 8, wherein the one or more circuit components include an electrical connector.

10. A fingerprint sensing module as defined in claim 8, wherein the one or more circuit components are connected to the sensor circuit by vias through the rigid substrate.

11. A fingerprint sensing module as defined in claim 4, wherein the sensor substrate and the rigid substrate are electrically connected by conductive adhesive between conductive interconnect pads on the respective substrates.

12. A fingerprint sensing module as defined in claim 4, wherein the sensor substrate has a larger area than the rigid substrate.

13. A fingerprint sensing module as defined in claim 4, wherein the sensor substrate is affixed to at least two surfaces of the rigid substrate.

14. A fingerprint sensing module as defined in claim 4, further comprising a base for mounting of the sensor substrate and the rigid substrate.

15. A fingerprint sensing module as defined in claim 14, wherein the base has a curved surface for mounting of the sensor substrate.

16. A fingerprint sensing module as defined in claim 3, wherein the at least one integrated circuit is affixed to the sensor substrate by a chip-on-film process.

17. A fingerprint sensing module as defined in claim 2, wherein said velocity sensor comprises two or more finger detectors spaced apart along a direction of movement of the finger, each of said finger detectors including at least one drive plate and at least one pickup plate, wherein an end of the finger passing over each of said finger detectors produces a change in capacitance between respective drive plates and pickup plates.

18. A fingerprint sensing module as defined in claim 2, wherein the sensor substrate comprises a rigid substrate.

19. A fingerprint sensing module as defined in claim 1, wherein the image sensor comprises an image pickup plate disposed generally orthogonally to a direction of movement of the finger, and a plurality of image drive plates in spaced relation to said image pickup plate to define a plurality of sensor gaps between respective image drive plates and said image pickup plate, wherein the ridge peaks and ridge valleys of the fingerprint passing over the sensor gaps produce a change in capacitance between respective image drive plates and said image pickup plate.

20. A fingerprint sensing module as defined in claim 19, wherein said image pickup plate and said plurality of image drive plates are substantially coplanar.

21. A fingerprint sensing module as defined in claim 1, wherein the sensor substrate is configured so that a finger is swiped over the sensing side of the sensor substrate for fingerprint sensing.

22. A fingerprint sensing module as defined in claim 1, further comprising a flexible substrate having a velocity sensor including conductive traces on the flexible substrate, wherein the velocity sensor is electrically connected to the sensor circuit, and a base for mounting the sensor substrate and the flexible substrate such that the image sensor and the velocity sensor are substantially coplanar.

23. A fingerprint sensing module comprising:
   a flexible substrate having a sensing side and a circuit side;
   an image sensor including conductive traces on the circuit side of the flexible substrate and comprising:
      at least one linear array of capacitive sensors for capacitive sensing of ridge peaks and ridge valleys of a fingerprint on a moving finger, at least one image pickup plate disposed generally orthogonally to a direction of movement of the finger, and at least one drive plate in spaced relation to said at least one image pickup plate to define at least one sensor gap between the respective at least one image drive plate and said at least one image pickup plate, wherein the ridge peaks and ridge valleys of the fingerprint passing over the at least one sensor gap produce a change in capacitance between the respective at least one image drive plate and said at least one image pickup plate; and a velocity sensor including conductive traces on the circuit side of the flexible substrate;

a sensor circuit including at least one integrated circuit mounted on the circuit side of the flexible substrate and electrically connected to the image sensor and the velocity sensor; and a rigid substrate, wherein the circuit side of the flexible substrate is affixed to a surface of the rigid substrate.

24. A fingerprint sensing module comprising:
a rigid substrate;
an image sensor including conductive traces on the substrate and comprising:
   at least one linear array of capacitive sensors for capacitive sensing of ridge peaks and ridge valleys of a fingerprint on a moving finger,
   at least one image pickup plate disposed generally orthogonally to a direction of movement of the finger, and at least one drive plate in spaced relation to said at least one image pickup plate to define at least one sensor gap between the respective at least one image drive plate and said at least one image pickup plate, wherein the ridge peaks and ridge valleys of the fingerprint passing over the at least one sensor gap produce a change in capacitance between the respective at least one image drive plate and said at least one image pickup plate; and
a velocity sensor including conductive traces on the substrate; and
a sensor circuit including at least one integrated circuit mounted on the substrate and electrically connected to the image sensor and the velocity sensor, wherein the image sensor, the velocity sensor and the sensor circuit are mounted on a first surface of the rigid substrate.

25. A fingerprint sensing module as defined in claim 24, further comprising a protective coating over the image sensor and the velocity sensor.

26. A fingerprint sensing module as defined in claim 24, wherein the image sensor comprises a linear array of capacitive sensors for capacitive sensing of ridge peaks and ridge valleys of a fingerprint on a moving finger.

27. A fingerprint sensing module as defined in claim 26, wherein the image sensor comprises an image pickup plate disposed generally orthogonally to a direction of movement of the finger, and a plurality of image drive plates in spaced relation to said image pickup plate to define a plurality of sensor gaps between respective image drive plates and said image pickup plate, wherein the ridge peaks and ridge valleys of the fingerprint passing over the sensor gaps produce a change in capacitance between respective image drive plates and said image pickup plate.

28. A fingerprint sensing module as defined in claim 27, wherein the velocity sensor comprises two or more finger detectors spaced apart along a direction of movement of the finger, each of said finger detectors including at least one drive plate and at least one pickup plate, wherein an end of the finger passing over each of said finger detectors produces a change in capacitance between respective drive plates and pickup plates.

29. A method for making a fingerprint sensing module, comprising:
providing a flexible substrate having a sensing side and a circuit side;
forming an image sensor including conductive traces on the circuit side of the flexible substrate and comprising:
   at least one linear array of capacitive sensors for capacitive sensing of ridge peaks and ridge valleys of a fingerprint on a moving finger,
   at least one image pickup plate disposed generally orthogonally to a direction of movement of the finger, and at least one drive plate in spaced relation to said at least one image pickup plate to define at least one sensor gap between the respective at least one image drive plate and said at least one image pickup plate, wherein the ridge peaks and ridge valleys of the fingerprint passing over the at least one sensor gap produce a change in capacitance between the respective at least one image drive plate and said at least one image pickup plate; and
forming a velocity sensor including conductive traces on the circuit side of the flexible substrate;
mounting a sensor circuit including at least one integrated circuit on the circuit side of the flexible substrate; and
affixing the circuit side of the flexible substrate to a surface of a rigid substrate.

30. A fingerprint sensing module comprising:
a first flexible substrate having an image sensor including conductive traces on the first flexible substrate, said image sensor comprising:
   at least one linear array of capacitive sensors for capacitive sensing of ridge peaks and ridge valleys of a fingerprint on a moving finger,
   at least one image pickup plate disposed generally orthogonally to a direction of movement of the finger, and at least one drive plate in spaced relation to said at least one image pickup plate to define at least one sensor gap between the respective at least one image drive plate and said at least one image pickup plate, wherein the ridge peaks and ridge valleys of the fingerprint passing over the at least one sensor gap produce a change in capacitance between the respective at least one image drive plate and said at least one image pickup plate; and
   said first flexible substrate also having a sensor integrated circuit mounted on the first flexible substrate and electrically connected to the image sensor;
said conductive traces operating as a velocity sensor; and
a base for mounting the first flexible substrates so that the conductive traces of the image sensor and the velocity sensor are substantially unitary.

31. A fingerprint sensing module as defined in claim 30, further comprising a rigid substrate mounted to the base and connected to the first flexible substrate.

* * * * *